March 9, 1937.                G. M. PESTARINI                2,073,526
                           DYNAMO-ELECTRIC MACHINE
                              Filed Nov. 8, 1934

INVENTOR.
GIUSEPPE MASSIMO PESTARINI
BY Harry E. Dunham
ATTORNEY.

Patented Mar. 9, 1937

2,073,526

UNITED STATES PATENT OFFICE 2,073,526

DYNAMO-ELECTRIC MACHINE

Giuseppe Massimo Pestarini, Sheffield, England

Application November 8, 1934, Serial No. 752,023
In Great Britain November 15, 1933

7 Claims. (Cl. 171—123)

This invention relates to dynamo electric machines and more particularly to that class of machine known as metadynes. A metadyne essentially is a rotary machine comprising an armature having a commutator and a stator within which the armature is rotated at a substantially constant speed. It also comprises a set of primary brushes and a set of secondary brushes spaced between the primary brushes around the commutator. The machine relies largely for its action upon the fluxes set up by the currents flowing in the armature between the primary brushes and between the secondary brushes respectively and when rotated at constant speed possesses the property that when a constant voltage is applied to the primary brushes the secondary current, which usually supplies a load circuit, remains constant, or has some desired relationship with the voltage across the load. The machine may have more than one commutator or more than one winding on the armature.

The theory of the machine is briefly as follows: the current flowing between the primary brushes produces a flux having an axis along the primary commutating axis which flux produces an electromotive force between the secondary brushes. When the secondary brushes are closed through an electric circuit the secondary current produces a flux along the secondary commutating axis which produces a back electromotive force between the primary brushes.

Thus any variation in the secondary current would vary the secondary flux and hence the primary back electromotive force in such a direction as to allow a primary current to flow which will tend to maintain the secondary current constant. For a more complete description of the underlying theory reference may be made to my U. S. Patent No. 2,038,380, April 21, 1936.

As explained in the above mentioned application the reaction between the primary current $I_1$ and the secondary flux $\Phi_2$ produces a motoring torque which is proportional to the product $I_1\Phi_2$ and the reaction between the secondary current $I_2$ and the primary flux $\Phi_1$ produces a generator torque which is proportional to the product $I_2\Phi_1$. Normally $I_1\Phi_2=I_2\Phi_1$ so that the machine is practically torqueless; if, however, this balance is upset the motoring torque will be greater or less than the generator torque so that the machine will respectively have either a motoring action supplying mechanical energy to the shaft or a generator action deriving its mechanical energy from the shaft.

Since $\Phi_1$ is produced by $I_1$, and $\Phi_2$ by $I_2$ we have the relationships that $\Phi_1=k_1I_1$ and $\Phi_2=k_2I_2$ where $k_1$ and $k_2$ are constants dependent upon the characteristics of the paths traversed respectively by the primary and secondary fluxes. In the case of a uniformly arranged stator $k_1$ and $k_2$ will of course be equal so that $$\frac{\Phi_1}{\Phi_2}=\frac{I_1}{I_2} \text{ and } \frac{I_1\Phi_2}{I_2\Phi_1}=1$$

which is the condition in which the motoring and generating torques are equal as explained above. If, however, $k_1$ and $k_2$ are unequal we obtain the relationship that $$\frac{I_1\Phi_2}{I_2\Phi_1}=\frac{k_2}{k_1}$$

That is to say that the ratio of the motoring torque to the generator torque will depend upon the respective characteristics of the secondary and primary flux paths. An object of the invention is so to arrange a metadyne that it will act either as a motor or alternatively as a generator.

With this object in view, according to the present invention, the metadyne is so arranged that the magnetic circuits traversed by the primary and secondary fluxes respectively have appreciably unequal reluctances so as to cause the machine to act either as a motor or to act as a generator.

In order that the invention may be more clearly understood reference will now be made to the accompanying drawing which illustrates examples of ways in which the invention may be carried into effect in the case of a two-pole machine and wherein:—

In all the embodiments illustrated a two-pole metadyne machine is shown. By a two-pole machine is contemplated one having two sets of primary brushes; namely, a positive and negative, and two sets of secondary brushes; namely, positive and negative. At the same time, however, the stators shown are provided with four salient poles, the respective primary and secondary brushes being located between the poles.

Figure 1:
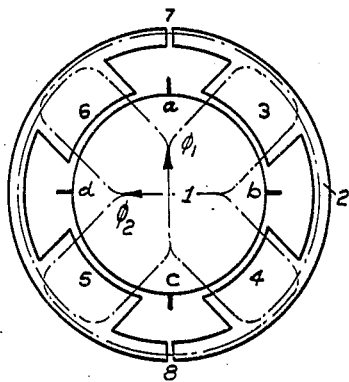
Fig. 1 shows one manner of carrying out the invention by means of air gaps in the stator frame.

Referring first of all to Fig. 1, the armature 1 is provided with four sets of brushes $a$, $b$, $c$, $d$, of which $a$ and $c$ constitute the primary brushes while $b$ and $d$ constitute the secondary brushes, the stator frame 2 being provided with four pole pieces 3, 4, 5, and 6.

It will be appreciated that the brushes have been shown in the position of the respective commutating zones, and that it is assumed for the sake of simplicity that the brush positions and respective commutating zones are coincident, although of course in actual practice this will not be the case. The primary flux set up by the current flowing through the commutator between $a$ and $c$ will be substantially parallel to the axis $a c$ and in the neighbourhood of the brush $a$ it will divide and pass in parallel paths through the two pole pieces 3 and 6. Similarly, on the other side of the armature in the neighbourhood of the brush $c$, the primary flux will divide and pass in parallel paths through the two pole pieces 4 and 5, so that the flux will pass substantially through two parallel paths of which the first path will include the pole pieces 3 and 4 and the portion of stator frame between the pole pieces 3 and 4, and the second path the pole pieces 5 and 6 and the portion of stator frame between the pole pieces 5 and 6. Similarly, the secondary current flowing between the brushes $b$ and $d$ will set up a flux having an axis passing through these brushes. This secondary flux again will divide into two parallel paths, the first path passing through the pole pieces 3 and 6 and the portion of stator frame between the pole pieces 3 and 6 and the second passing through the pole pieces 4 and 5 and the portion of stator frame between the pole pieces 4 and 5.

Figure 4:
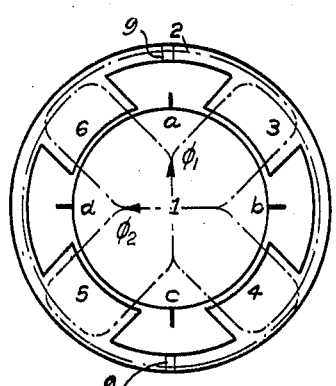
Fig. 4 shows a further manner of carrying out the invention by the use of a high reluctance path for one of the fluxes in the stator magnetic circuit.

In order to make the reluctance of the respective magnetic paths traversed by the primary and secondary fluxes unequal according to the present invention the stator frame is provided with air gaps or other high reluctance paths 7 and 8. These air gaps are in the paths of the secondary flux passing between the pole pieces 3 and 6, and between the pole pieces 4 and 5 respectively. These gaps, however, do not affect the primary magnetic flux, since this traverses those portions of the stator lying between the pole pieces 3 and 4 and between the pole pieces 5 and 6. As shown in Fig. 4, in place of the air gaps 7 and 8, a layer of suitable magnetically insulating or less permeable material 9 may be inserted in the stator frame at suitable points or the section of the stator frame at these points may be reduced so as to cause saturation at a rlatively small value of flux.

It will be appreciated that in the arrangement shown in Fig. 1 the secondary current will produce a smaller secondary flux than would be produced with a stator similar in all respects, but without the reluctance increasing air gaps 7 and 8, so that the product $I_2 \Phi_1$ will be greater than the product $I_1 \Phi_2$ and the machine will thus have a generator action, that is, it will require to be mechanically driven in order to supply a secondary current and remain in equilibrium.

Figure 2:
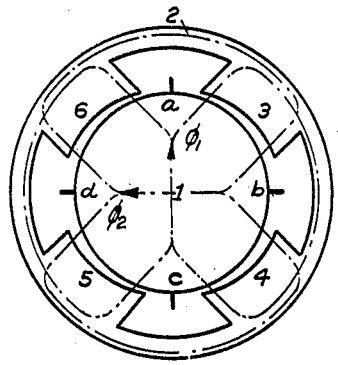
Fig. 2 shows another method of carrying out the invention by means of tapered air gaps between the armature and the pole faces.
Figure 3:
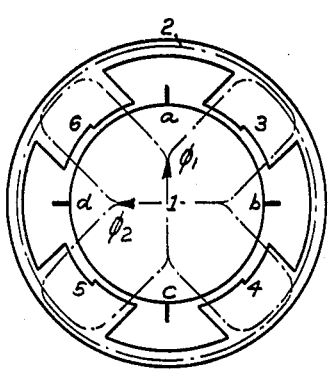
Fig. 3 shows an alternative arrangement with stepped air gaps.

The arrangement shown in Fig. 2 employs tapered air gaps between the armature 1 and the faces of the pole pieces 3, 4, 5, and 6 in place of the air gaps 7 and 8 of the previous arrangement. The primary flux $\Phi_1$ will pass mainly through the sides of the poles which are nearest to the brushes $a$ and $c$ respectively, and similarly the secondary flux $\Phi_2$ will pass through those sides of the poles which ahe nearest to the brushes $b$ and $d$, so that by gradually varying the length of the air gaps circumferentially in the manner shown the reluctance of the secondary circuit is made appreciably greater than that of the primary circuit. Also the graduating of the air gaps of each pole face might be made in two halves by providing a circumferentially stepped pole face so that the length of the air gap opposite one half of each pole face is greater than that of the opposite half of the pole face as shown in Fig. 3.

Whilst in the foregoing description the invention has been described more particularly as applied to a two-pole machine, it will be appreciated that it is not limited in this respect, but that it may have any convenient number of poles provided that the number of brushes and poles are made multiples of those in the examples given.

While I have illustrated and described particular embodiments of my invention, modifications thereof will occur to those skilled in the art. I desire it to be understood, therefore, that my invention is not to be limited to the arrangements disclosed and I intend, in the appended claims, to cover all modifications which do not depart from the spirit and scope of my invention.

I claim:

1. A metadyne dynamo-electric machine including an armature provided with windings and a commutator connected to said windings, means including a primary brush set associated with said commutator for providing a primary circuit through said armature and for producing a primary flux, means including a secondary brush set associated with said commutator and electrically displaced from said primary brush set for providing a secondary circuit through said armature and for producing a secondary flux, and a stator including a frame having pole pieces, each of said pole pieces being constructed and arranged with respect to other of said pole pieces to provide a stator magnetic path having a greater magnetic reluctance for one of said fluxes than for the other of said fluxes.

2. A metadyne dynamo-electric machine having an armature, means including a primary brush set associated with said armature for providing a primary circuit therethrough and for producing a primary flux, means including a secondary brush set associated with said armature and electrically displaced from said primary brush set for providing a secondary circuit through said armature and for producing a secondary flux, and a stator having pole pieces and being constructed and arranged to provide a path of higher magnetic reluctance for one of said fluxes than for the other of said fluxes, each of said pole pieces being arranged and adapted to carry both of said fluxes.

3. A metadyne dynamo-electric machine having an armature, means including a primary brush set associated with said armature for providing a primary circuit therethrough and for producing a primary flux, means including a secondary brush set associated with said armature and electrically displaced from said primary brush set for providing a secondary circuit through said armature and for producing a secondary flux, and a stator provided with pole pieces having pole faces, each of said pole faces being constructed and arranged to provide a smaller air gap between said armature and said pole faces for one of said fluxes than for the other of said fluxes.

4. A metadyne dynamo-electric machine having an armature, means including a primary brush set associated with said armature for providing a primary circuit therethrough and for producing a primary flux, means including a secondary brush set associated with said armature and electically displaced from said primary brush set for providing a secondary circuit through said armature and for producing a secondary flux, a stator including a frame provided with pole pieces, and means for providing a stator magnetic path of high reluctance between pairs of adjacent pole pieces as compared with the reluctance between other pairs of adjacent pole pieces, each of said latter pairs of pole pieces including a pole piece of said first mentioned pairs.

5. A metadyne dynamo-electric machine having an armature, means including a primary brush set associated with said armature for providing a primary circuit therethrough and for producing a primary flux, means including a secondary brush set associated with said armature and electrically displaced from said primary brush set for providing a secondary circuit through said armature and for producing a secondary flux, a stator including a frame provided with pole pieces, and means including an air gap arranged in said frame between pairs of said pole pieces for providing a high reluctance magnetic path between said pairs of said pole pieces as compared with the reluctance between others of said pole pieces.

6. A metadyne dynamo-electric machine having an armature, means including a primary brush set associated with said armature for providing a primary circuit therethrough and for producing a primary flux, means including a secondary brush set associated with said armature and electrically displaced from said primary brush set for providing a secondary circuit through said armature and for producing a secondary flux, and a stator provided with pole pieces having pole faces, said pole faces being tapered to provide an air gap of circumferentially gradually varying length between said armature and said pole faces, said pole pieces being arranged so as to provide an air gap of substantially equal length between said armature and adjacent portions of adjacent pole piece faces.

7. A metadyne dynamo-electric machine having an armature, means including a primary brush set associated with said armature for providing a primary circuit therethrough and for producing a primary flux, means including a secondary brush set associated with said armature and electrically displaced from said primary brush set for providing a secondary circuit through said armature and for producing a secondary flux, a stator provided with pole pieces having pole faces circumferentially stepped for providing an air gap between said armature and said pole pieces of different length, said pole pieces being arranged to provide an air gap of substantially equal length between said armature and the adjacent stepped portions of adjacent pole piece faces.

GIUSEPPE MASSIMO PESTARINI.